United States Patent [19]
Goodman

[11] 3,967,315
[45] June 29, 1976

[54] BEAM-INDEX COLOR TELEVISION DISPLAYS

[76] Inventor: David M. Goodman, 14272 Half Moon Bay Drive, Del Mar, Calif. 92014

[22] Filed: May 22, 1974

[21] Appl. No.: 472,154

Related U.S. Application Data

[63] Continuation-in-part of Ser. No. 345,197, Feb. 17, 1964, Pat. No. 3,826,867.

[52] U.S. Cl. ............................... 358/60; 358/67
[51] Int. Cl.² .................... H04N 9/31; H04N 9/24
[58] Field of Search .................. 358/60, 67, 69; 313/471

[56] References Cited
UNITED STATES PATENTS

| | | | |
|---|---|---|---|
| 3,081,414 | 3/1963 | Goodman | 358/67 X |
| 3,256,385 | 6/1966 | Miller | 358/60 |
| 3,277,235 | 10/1966 | Goodman | 358/67 |
| 3,519,742 | 7/1970 | Bjelland | 358/60 X |
| 3,527,879 | 9/1970 | Pritchard | 358/60 |
| 3,826,867 | 7/1974 | Goodman | 358/67 |

*Primary Examiner*—Benedict V. Safourek
*Assistant Examiner*—Mitchell Saffian

[57] ABSTRACT

Beam-index line-screen television display systems are disclosed for generating multi-color images throughout the size range from small direct view cathode ray tubes to projection type wall screen configurations. The image in the small screen display is generated by a scanning electron beam whereas the image generated in the large screen configuration is developed by a scanning optical beam. In both cases the excitation of the image producing target screen is synchronized by beam-indexing features which utilize optical index signals transmitted across the target screen.

34 Claims, 13 Drawing Figures

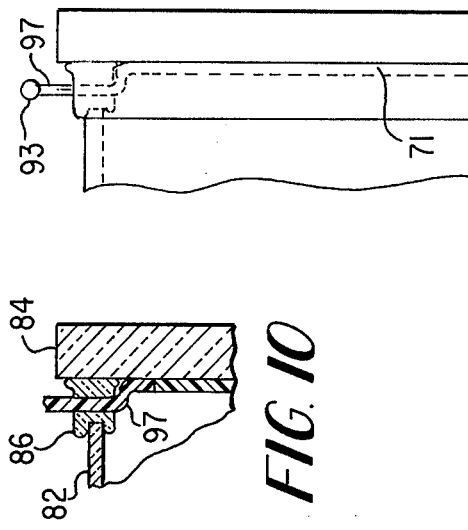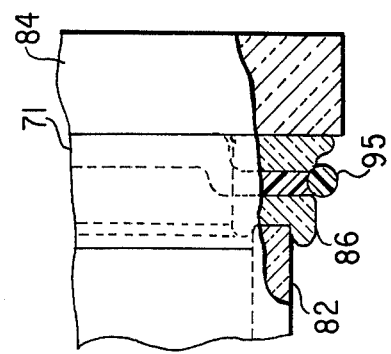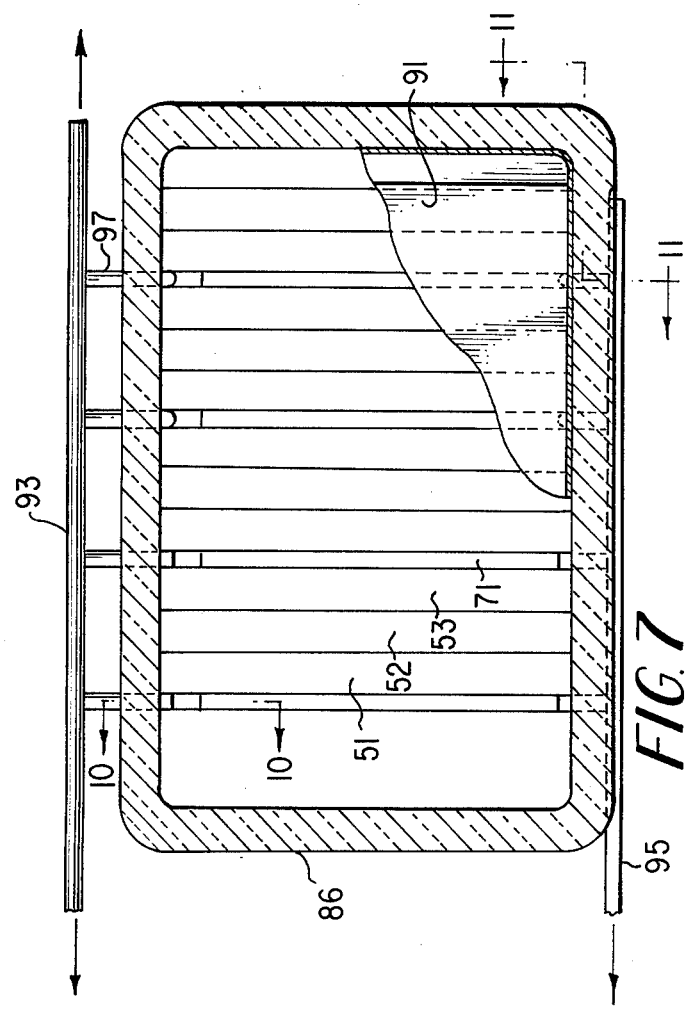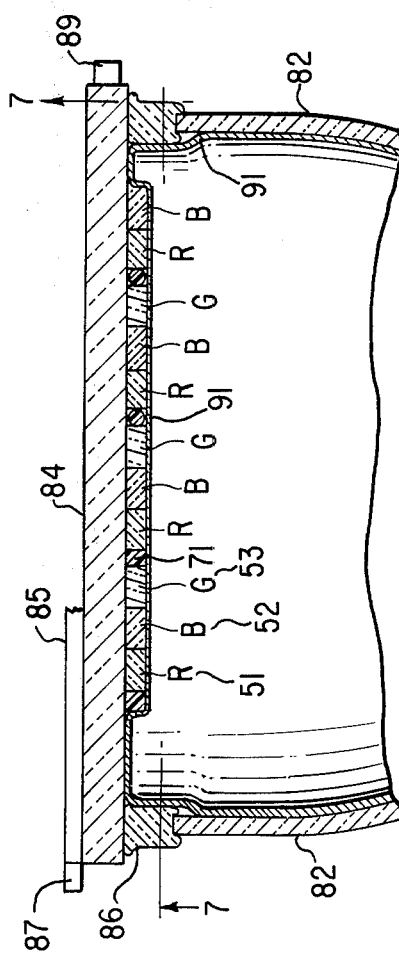
FIG. 8
FIG. 10
FIG. 11
FIG. 7
FIG. 9

BEAM-INDEX COLOR TELEVISION DISPLAYS

CROSS-REFERENCE TO RELATED APPLICATIONS

This application is a continuation-in-part on my co-pending application Ser. No. 345,197 filed Feb. 17, 1964, now U.S. Pat. No. 3,826,867 on July 30, 1974 which is incorporated herein by reference.

BACKGROUND OF THE INVENTION

1. Field of the Invention

One aspect of the invention disclosed in application Ser. No. 345,197 which is expanded upon in this application is the feature whereby a scanning beam of energy is made to impinge upon a target screen comprising optical fibers or light pipe members which are used to transmit optical radiation across the target screen. Specifically, optical index radiation is transmitted parallel to the target screen generally from its interior regions to its periphery where it is used for beam-indexing purposes to control the generation of multi-color displays.

Another aspect of the invention disclosed in Serial 345,197 which is expanded upon herein relates to the generation of large screen displays wherein a scanning optical beam excites a line-screen target placed at a distance from the source of the optical beam. In particular, one embodiment is envisaged wherein a screen is placed against or mounted on a wall, as a picture in a frame, to be excited by a scanning optical beam in order to produce a color picture. Index radiation is developed, to synchronize the excitation of the target screen, and is concentrated for transmission either through the air or via electrical or optical cables to a color signal processor which modulates the scanning beam. If a cable configuration is used, it is contemplated that the cable may be run across the ceiling of the room as an added convenience.

2. Description of the Prior Art

Beam-index color cathode ray tubes have been proposed by many workers, in many countries, and several working prototypes have been described in the open literature. Generally speaking they have not been characterized by high brightness which rules out their use in projection television schemes. As a consequence most low cost, large screen color displays have resorted to the use of three cathode ray tubes, each developing a different color picture which is projected in careful registration upon a viewing screen. Several high cost projection systems have been developed, and some marketed commercially, which rely on phase gratings, and optically deformed surfaces but these are not related to the instant invention except as to the final result achieved, namely, a large screen full color display operating in the television mode. See, for example, True U.S. Pat. No. 3,730,992.

Another system for a large screen television type raster scanned display is typified by a three beam laser system equivalent to the three CRT combination referred to above. Pinnow et al U.S. Pat. No. 3,652,956 describes a variation of this type of display in which the red color is produced at the target screen.

To applicant's knowledge, there is no prior art which describes the use of a line-screen beam-index display system which generates a large screen full color display by optical scanning as set forth in applicant's copending application Ser. No. 345,197.

Furthermore, with respect to either direct view or projection displays the prior art of others is silent insofar as applicant's teachings are concerned wherein the index radiation generated at the viewing screen is detected by the scintillation process, thereby to capture a large amount of the index radiation. Light pipe transmission is utilized in conjunction with the scintillation process and this too is believed to be set forth in television type raster scan color display apparatus solely by applicant in this application, and in his prior teachings.

The search for a successful low cost projection type color apparatus has persisted for a long time. See, for example, Von Ardenne U.S. Pat. 2,265,657 which was filed 35 years ago, in 1939. And then note the recent comment attributed to the representative of a leading international producer of color television receivers which is reproduced here:

> The Prime Minister's statement that no import quotas would be placed on colour television sets coming into Australia has been welcomed by the senior managing director of the Sony Corporation of Japan. * * * Mr. Yoshie said in ten years consumers would be able to purchase television sets ranging from one inch to wall size.
>
> ABC Newsroom
> Canberra, A.C.T., Australia
> 7:00 p.m., 27 April 1974

The instant invention describes a system which can be manufactured to yield these results immediately.

SUMMARY OF THE INVENTION

This invention is directed to improved methods and means for generating, collecting, and concentrating optical index radiation from cathode ray tubes or projection type display screens. Optical index radiation which denotes the position of the scanning beam of energy is light piped parallel to the image generating display screen to the periphery thereof. Adjacent the periphery is an elongated light pipe-scintillator which responds to the light piped optical index radiation to produce a secondary optical index signal. The secondary optical index signal is concentrated in the elongated light pipe-scintillator to emerge at an exit end thereof in concentrated form. This arrangement provides a strong optical index signal, of small dimensions. It also provides for a compact assembly of the index signal concentrator with the display screen so as to efficiently use the space surrounding the display screen. This arrangement is particularly advantageous for large screen displays.

BRIEF DESCRIPTION OF THE DRAWING

FIG. 7, taken in conjunction with FIGS. 8 - 11, depicts a sectional view of a cathode ray tube akin to FIG. 6 but wherein the plurality of optical light pipes are brought through a frit seal joining the faceplate to the funnel of the tube. Means for combining the optical signals in the light pipes are shown disposed outside the envelope of the tube.

FIG. 8 is a side view of the faceplate, frit seal, part of the funnel section, and the optical light pipes of FIG. 7.

FIG. 9 is a side view in section of a faceplate, frit seal, part of the funnel section, and the target screen of FIG. 7.

FIG. 10 illustrates, in section, an extension of a light pipe being brought through the frit seal.

FIG. 11 illustrates an optical light pipe being brought through the frit seal, and a secondary light pipe which is used to combine optical index signals from a plurality of the optical light pipes.

DESCRIPTION OF THE PREFERRED EMBODIMENTS

Figure 1:
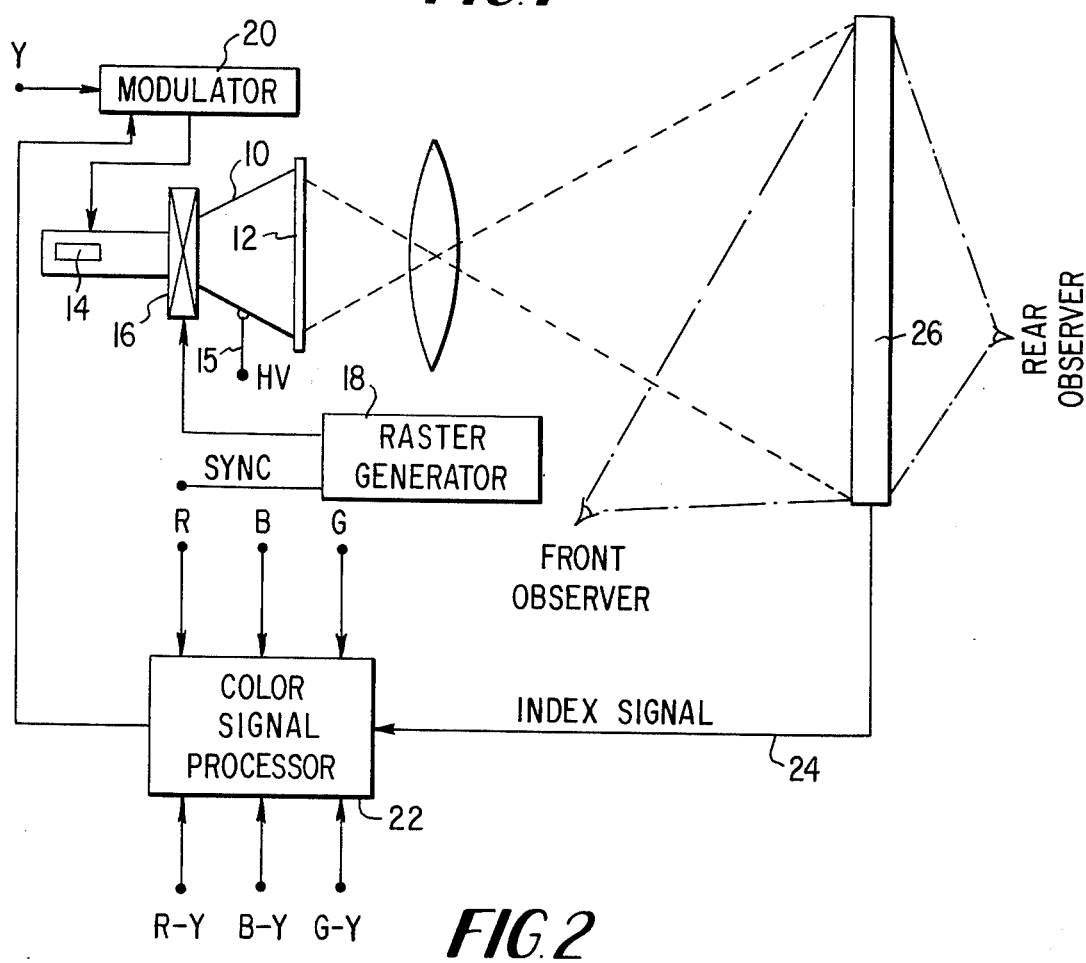
FIG. 1 illustrates in block diagram format a display system using a projection type cathode ray tube (CRT) and a refractive lens system for transmitting the image developed by the cathode ray tube to a target screen.

In FIG. 1, projection type cathode ray tube (CRT) 10 has a target screen 12 which is excited by an electron beam emitted by electron gun 14 and which is scanned by deflection means 16. Scanning currents are provided by raster generator 18. High voltage for the target screen typically is introduced at 15. This construction is conventional.

In one embodiment of the instant invention the target screen comprises a layer of P-16 phosphor which, as is well known, radiates in the near ultraviolet peaking at about 3800 Angstroms when excited by the scanning electron beam. Modulator 20 controls the intensity of the scanning electron beam as it scans a raster across the target screen. The inputs to the modulator 20 are the luminance signal Y and outputs from color signal processor 22. The processor 22 receives R, B, and G color signals or color difference signals R-Y, B-Y, and G-Y. These color signals are sampled by pulses derived from the index pulses to provide a sequential train of pulses for modulating electrodes of the electron gun 14. Varying amounts of luminance signal Y may be added to the sequential train of pulses to achieve optimum color balance. The color signals and raster scan are synchronized in conventional fashion.

The end result of the arrangement of FIG. 1 is that a scanning beam of modulated ultraviolet light is projected upon display screen 26. To synchronize the excitation of the target screen 12 and thence display screen 26, index signal 24 is depicted as emanating from the display screen to feed into processor 22. The scanning beam thereby is modulated to generate a full color picture on the screen 26 via intermediate screen 12. The details of screen 26 will be described with respect to FIG. 3.

Details of the electronic circuitry are omitted as they are not necessary for a proper understanding of this invention. Nevertheless for completeness reference is made to my U.S. Pat. No. 3,564,121 where beam modulation and index control features are set forth. Reference is also made to DeMesquita et al U.S. Pat. No. 3,715,611 for alternates to the conventional P-16 phosphors.

In the arrangement of FIG. 1 just described the scanning electron beam generates on target screen 12 a rapidly decaying synthetic ultraviolet replica of the image to be generated by display screen 26. This feature differs from the conventional flying spot scanner where the optical scanning beam from the CRT is of constant intensity. Note also that beam-index control of the replica of the image is derived not from the CRT but from the remote display screen. Color signal processor 40 preferably is situated proximate the CRT 10 but may be placed near screen 26 if desired.

Figure 2:
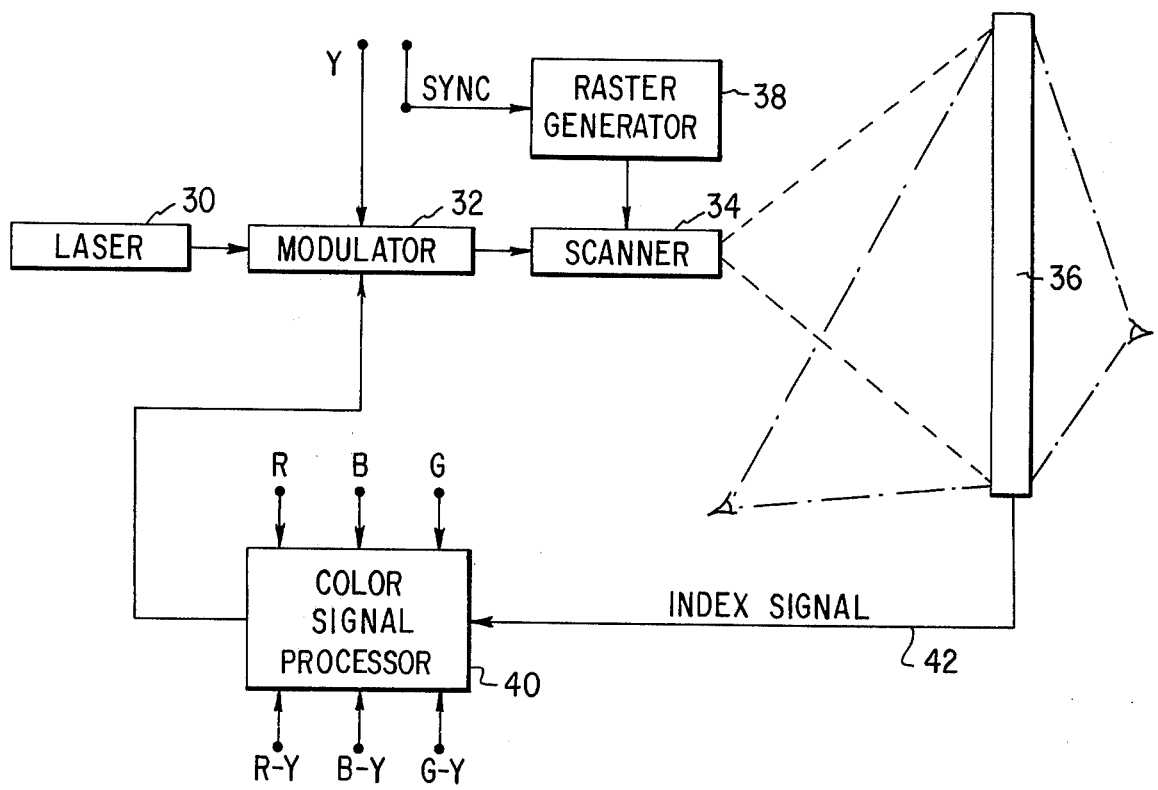
FIG. 2 illustrates in block diagram format a display system using a laser as a source of light which is modulated and scanned across a target screen.

In FIG. 2 an alternate and conventional arrangement is shown for developing the synchronized and modulated scanning light beam. Thus, instead of CRT 10 which generates an intermediate monochrome "image" there is a laser light source 30 modulated by means 32 with color signals furnished by processor 40. The raster generator 38 is synchronized with the color signals R, B, G or R-Y, B-Y, G-Y. Scanner 34 deflects the laser light beam to trace out a raster pattern. Preferably the scanning beam is in the ultraviolet. Index signal 42 is derived from target screen 36 as will be described next.

Figure 3:
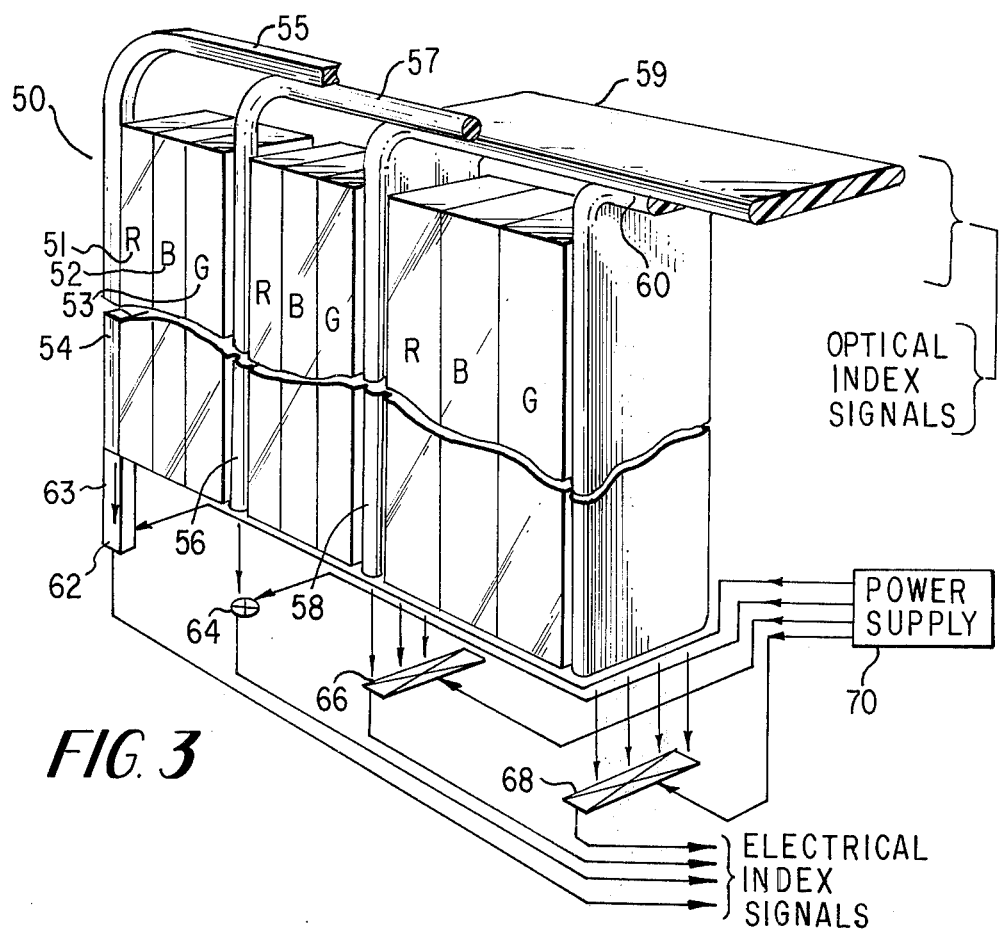
FIG. 3 illustrates in exaggerated perspective a target screen, for use with the arrangement of FIGS. 1 and 2, comprising repeating groups of red, blue, and green light emitting strips interspersed with optical light pipes which generate optical index signals.

In FIG. 3 an enlarged perspective is illustrated of a target screen 50 with strip-like members 51, 52, and 53 which produce red, blue and green light, respectively, in response to excitation by the scanning beam of optical energy. In the preferred embodiment scanning takes place across the target screen to excite in sequence an index strip 54, and then 51, 52, 53 followed by index strip 56, etc.

Index strip 54 (and 56, 58, 60) is made of a plastic scintillator such as NE-102 supplied by Nuclear Enterprises in San Carlos, Calif. In response to excitation by the ultraviolet scanning beam, it generates an optical index signal which is light piped, as depicted at 63, to exit terminal 62. At the other end of the index strip 54 it is light piped along length 55.

The target screen 50 may be thin, and rollable, in which case the index strips are filamentary in nature. They may also be square as depicted at 55 or round as at 57. The target screen may be rigid, and self-supporting, in which case rectangular ribbons of light pipe-scintillator 59 and 60 may be preferred.

The optical index signals may be preserved in optical form as illustrated at 55, 57, 59 of FIG. 3 or they may be converted to electrical signals by photo-detectors illustrated at 62, 64, 66 and 68. The photo-detectors may be spaced from the light pipes as at 64, 66, and 68 or they may be positioned on the exit terminal as at 62.

Power supply 70 furnishes bias for the photo-detectors. Conventional P-22 phosphors are suitable materials for the color producing strips 51, 52, 53. Photo-detectors 62, 64, 66 and 68 may be conventional high speed photo-diodes.

Figure 4:
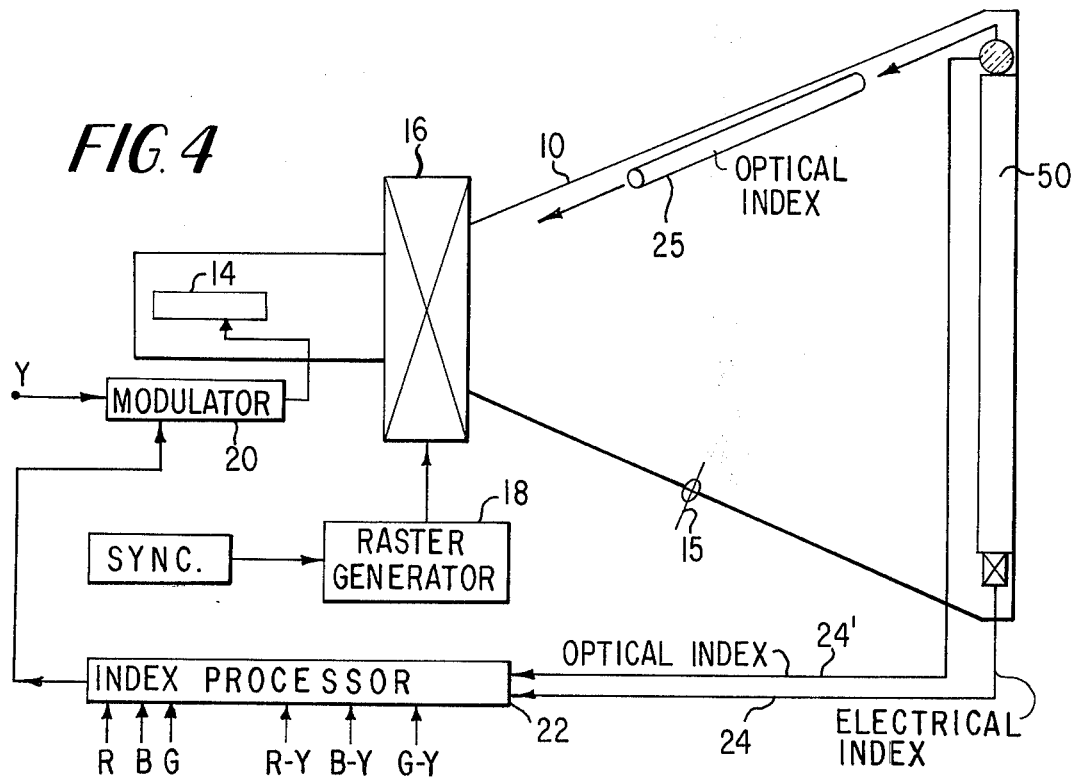
FIG. 4 depicts a CRT arrangement, alternate to FIG. 1, wherein the color picture is developed in the cathode ray tube prior to the image being projected on the target screen. The arrangement of FIG. 4 can also be used for direct viewing.

It will be readily appreciated by those skilled in beam-index technology that the screen 50 of FIG. 3 provides all that is needed to fulfill the requirements of screen 26 of FIG. 1 and screen 36 of FIG. 2. It will also be appreciated that the structure 50 of FIG. 3 can be modified for incorporation into a CRT as depicted in FIG. 4 where optical index signal 25 is light piped within the CRT as set forth in more detail in my Ser. No. 345,197. See also Turner U.S. Pat. No. 3,311,773 for reference to a material suitable for the index strips in a CRT. Electrical index signal 24 may be derived from the faceplate. Also, optical index 24' may be derived at the faceplate as will be described. The numeration of the other elements in FIG. 4 correspond to like elements in FIG. 1.

Figure 5:
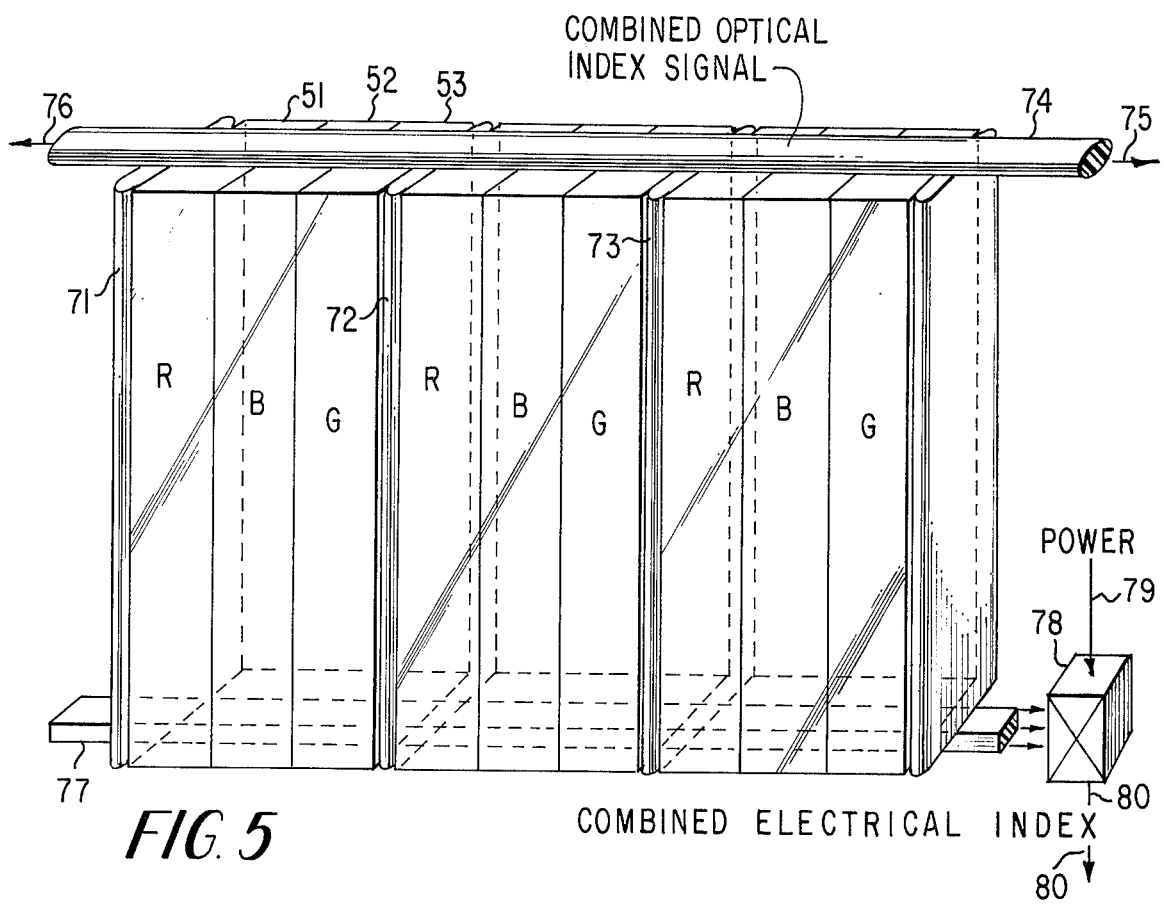
FIG. 5 illustrates in exaggerated perspective a target screen akin to that in FIG. 3 wherein a plurality of optical light pipes, interspersed with the color emitting strips, transmit their optical index signals to impinge upon the side wall of another light pipe whereby different index signals are combined into a signal on a common path.

The optical index signals in FIG. 3 (and in Ser. No. 345,197) are combined by physically bringing together the exit terminals of the light pipes. A superior arrangement is shown in FIG. 5 where the plurality of optical index signals are combiined via the scintillation process. Thus, in FIG. 5, index strips 71, 72, 73, typically are made of NE-102 which generates a blue-white index radiation in response to excitation by ultraviolet light. This blue-white radiation is piped up the target screen to impinge upon light pipe-scintillator 74. Typically, element 74 is made of NE-103 also manufactured by Nuclear Enterprises. This scintillator has the property of responding to the blue-white excitation of NE-102 thereby to generate longer wavelength optical radiation which is light piped to exit terminals 75 and 76.

Thus, before and after the scanning beam traverses color producing strips 51, 52, 53 it will excite index strips 71, 72, 73 which in turn will excite strip 74. By this process a combined optical index signal emerges at 75 and 76 in the form of a series or train of pulses separated in time. It is these pulses which are then used to effect proper registration of the colors on the display screen.

At the bottom of FIG. 5, secondary light pipe-scintillator 77 is depicted feeding its output into photo-detector 78. Bias for the photo-detector is provided by power source 79, and electrical output is at 80. Comparison of FIG. 5 with FIG. 3 shows clearly the reduction in electrical connections which are brought about by using the secondary scintillator to collect and concentrate the output from the index strips. Note also the reduction in photo-detectors from four to one. In practice, the reduction in complexity is much more striking because a typical multi-color display will contain many more than the mere four strips used for illustration and explanation.

Figure 6:
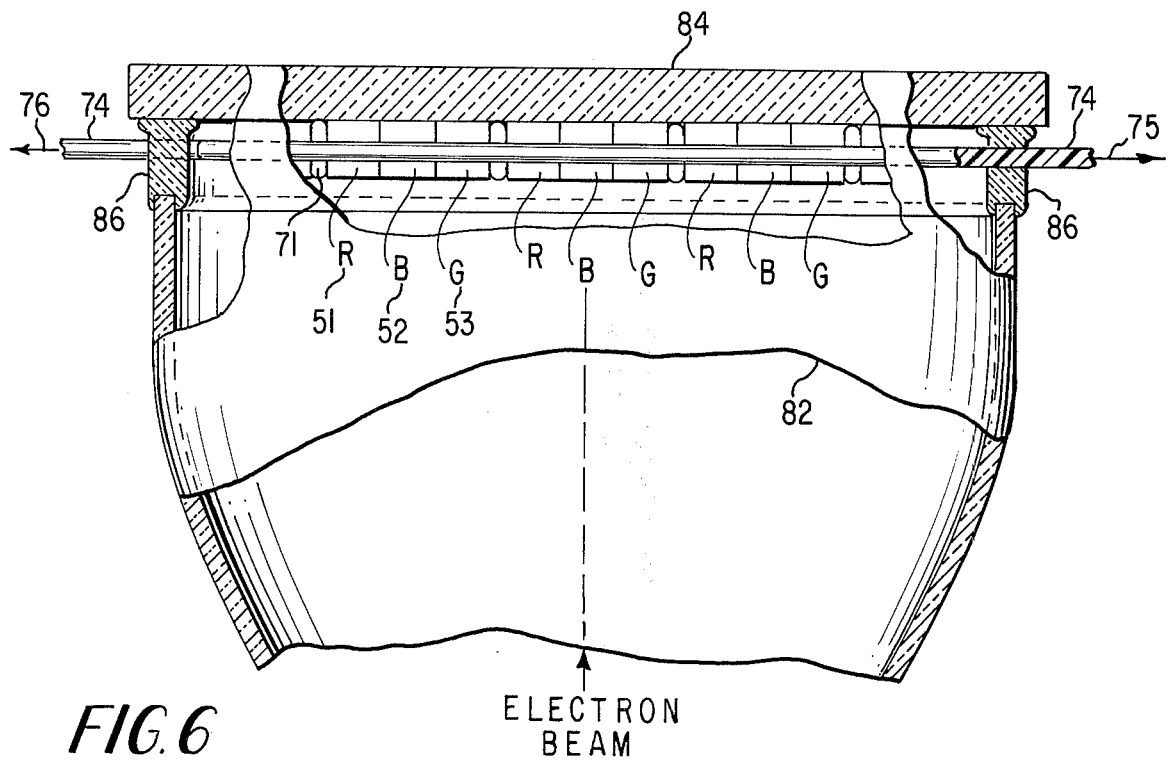
FIG. 6 depicts a target screen, akin to that of FIG. 5, inside a cathode ray tube. The combining of the index signals takes place inside the tube envelope.

In FIG. 6, a target screen akin to that of FIG. 5 is inserted in a CRT. Faceplate 84 is shown joined to funnel section 82 via frit seal 86. The index signal combiner 74 is passed through the frit seal to bring the combined optical index signal to the outside of the CRT envelope. Element 74 in this embodiment should withstand CRT processing temperatures. To comply with this requirement, element 74 can be made of suitable glass tubing to be filled with a liquid scintillator after the CRT is completed.

Alternate construction of the CRT of FIG. 6 is illustrated in FIGS. 7 – 11. Red, blue, and green emitting phosphor strips 51, 52, 53 are deposited on the inside of faceplate 84. In register therewith are index signal producing strips 71 such as light pipe-scintillators as set forth in my Ser. No. 345,197. Faceplate 84 is joined to funnel section 82 via frit seal 86. Four of the light pipes 71 are shown bringing their index radiation to the outside of the tube through the frit seal 86. At the bottom of FIG. 7, index signal combiner 95 is shown. It may be made of either NE-102 or NE-103 as both will respond to the excitation of the ultraviolet index radiation light piped through 71. Element 95 is shown to be recessed slightly in FIGS. 7, 8, and 9 which is a convenience and not a necessity. At the top of FIG. 7, the index signal combiner 93 is spaced slightly away from the faceplate. Note also from FIG. 10 that index light pipe 71 may be coupled to another light pipe section 97 which may be chosen to be more compatible with the frit seal 86.

Note also in FIG. 9 that the conventional aluminum layer, designated 91, is situated on top of both the color producing phosphors 51, 52, 53 and the index strips 71, 91. This simplifies considerably the construction of the CRT because the complicated and relatively intricate step of laying the index strip on top of the thin and fragile aluminum layer is dispensed with.

Two other ways of eliminating this important step in the manufacture of a color CRT are set forth in Serial 345,197. One way makes use of the light pipe action in the faceplate and funnel section of the CRT to transmit and concentrate the index signal. With frit seal 86 this becomes difficult. The other way is to surround the front exterior of the faceplate 84 with a smooth and continuous transparent scintillator 85, such as NE-102, which responds to the index radiation (generated by index strips 71, 91, etc.) transmitted through faceplate 84. Thus, in Ser. No. 345,197 the optical index signals developed within the transparent scintillator equivalent to 85 are collected and concentrated in a funnel shaped extension surrounding the CRT envelope. In this specification, an elongated additional scintillator 87, such as NE-103, is used to collect and concentrate the index radiation.

Figure 12:
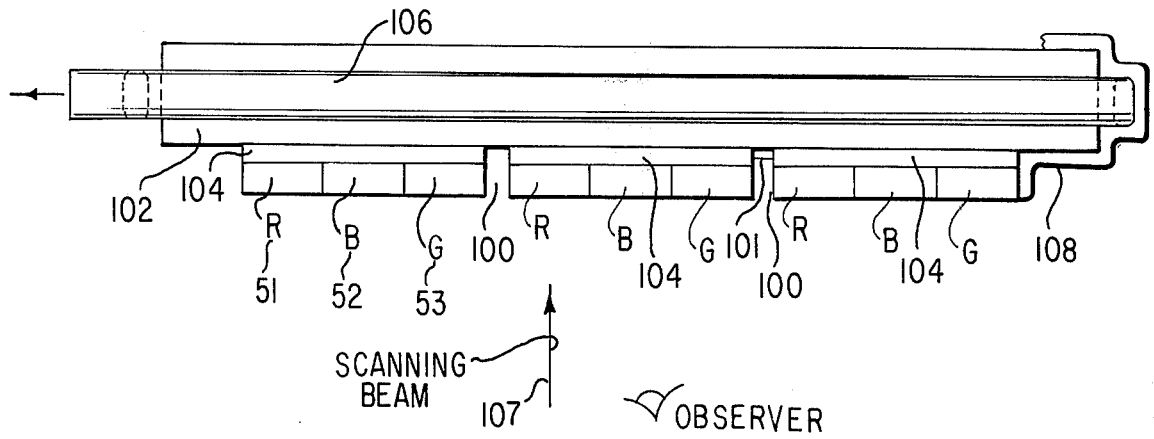
FIG. 12 depicts a display screen wherein a special substrate is used to generate a primary optical index signal.
Figure 13:
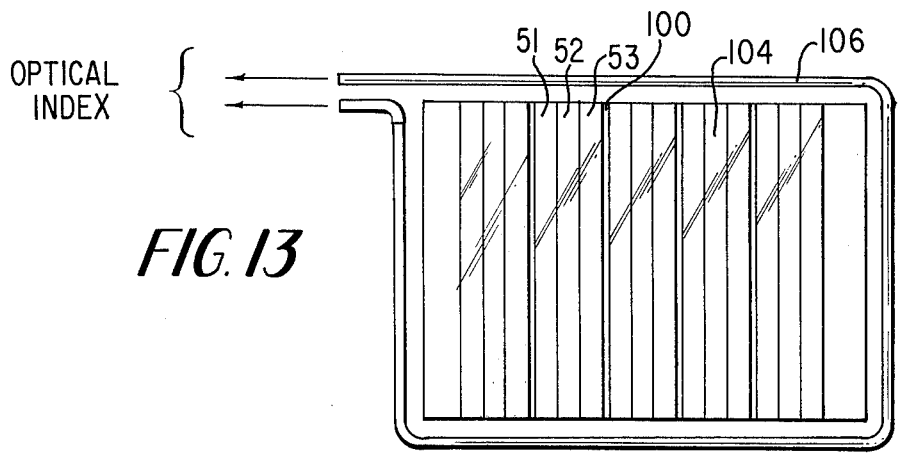
FIG. 13 is a front view of the display screen of FIG. 12 and illustrates a light pipe collector which is disposed along the edge of the substrate to generate a secondary optical index signal.

See also FIGS. 12 and 13 which teach in the alternative that faceplate 84 may be made of a transparent scintillator (see Turner U.S. Pat. No. 3,311,773) which responds to electron beam excitation. In this configuration, for a CRT, the color producing strips 51, 52, 53 are relatively thick to absorb the electron beam and the index strips 71, 91, etc., are supplied by narrow strip-like openings in the color producing strips. Secondary scintillator 89 may be a strip of NE-102 to collect and concentrate the index radiation.

Returning to the wall screen structure, the teachings of FIG. 7 are applied in modified form to the structure of FIGS. 12 and 13. An ultraviolet scanning beam is depicted at 107. Fluorescent materials 51, 52, and 53 emit red, blue, and green light, respectively, in response to excitation by scanning beam 107. A rectangular block of scintillator 102 supports the color emitting strips 51, 52, 53. A reflective layer 104 such as aluminum may separate the fluorescent strips from the backing of scintillator 102. A clearance passage 100 permits the scanning beam to excite the scintillator 102. Passage 100 thus becomes the index marker in that material 102 will scintillate when it is impinged upon by the scanning beam. Scintillations generated in the interior of 102 are light piped to its periphery.

Positioned adjacent the periphery is secondary scintillator 106 which responds to the optical radiation produced by scintillator 102 thereby to generate the secondary or output optical index signal. Element 106 is shown to surround the rectangular block 102 but it may be positioned less than full way around and still function effectively. Also, filter element 101 is shown if it is desired to reduce the effects of ambient illumination. This filter is narrow band, selected to pass primarily the wavelengths of the optical scanning beam. And, lastly, reflective or blocking member 108 surrounds the remainder of the target screen to prevent excess ambient illumination from exciting the scintillators. Scintillator 102 may be NE-102 and scintillator 106 may be NE-103, as previously identified.

Attention is drawn to the compact arrangement which results from this configuration and that of FIGS. 7 – 10. See Canada Pat. No. 743,198 which discusses the desirability of volumetric efficiency.

For detailed information on scintillators which may be used with this invention, reference is made to Organic Scintillation Detectors by E. Schram, Elsevier Publishing Co., 1963. See also Hyman U.S. Pat. 2,710,284. For details on frit sealing reference is made to Claypoole U.S. Pat. No. 2,889,952.

Conventional P-22 phosphors are cited previously in this disclosure. Alternatively, common fluorescent paints may be used. It is also possible to use R, G, and B filter elements in combination with white color emitting phosphors as a substitute configuration for the target screen. The light pipe-scintillators may be made of a single material or they may consist of a core and "cladding" and still provide the features set forth in this specification.

Although the optical scanning beam preferably is in the ultraviolet region of the spectrum, other wavelengths may be substituted with appropriate changes in strips 51, 52, and 53. For example, a short-wave blue scanning beam may be used with a blue-to-blue converter selected for color producing strip 52 and with NE-103 used for the index strips 54, 56, and 58 of FIG. 3.

Whether the display screen is front or rear projection, note that all three colors result from emitted light rather then reflected light. This type of "living" screen provides a wide viewing angle.

Lastly, it was mentioned at the outset of this specification that one of the reasons for not employing a beam-index color CRT as the primary source of the image in a projection television apparatus was the inability of the prior art to develop a sufficiently bright color picture. Another long standing difficulty in prior art direct view beam-index kinescopes has been that of extracting an index signal with a good signal to noise ratio. Accordingly, it is fair to state that not only does this invention provide a good, crisp index signal for kinescopes but it also solves an even more intense problem, namely, the derivation of a good index signal from a wall screen display.

Having described my invention, I claim:

1. A beam-index line-screen multi-color raster scan projection television display apparatus comprising: first means for generating and scanning an optical beam of energy; a display screen, comprising strip-like regions of different color producing elements, disposed remote from said first means but capable of being positioned so as to be scanned by said optical beam thereby to provide a multi-color television image; beam-index means comprising a plurality of spaced apart strip-like regions, in register with the color producing elements, responsive to excitation by said optical beam of energy for generating output index signals indicative of the position of impact of the optical beam on the display screen; a color signal processor comprising first input means for receiving color signals to be displayed, second input means for receiving said output index signals, and output means for modulating said optical beam; and means for transmitting said output index signals from the display screen to said second input means.

2. The apparatus of claim 1 wherein said first means provides an optical beam of energy centered in the ultraviolet region of the spectrum in the vicinity of 3800 Angstroms.

3. The apparatus of claim 1 wherein said first means comprises a cathode ray tube with an electron gun for furnishing a scannable electron beam and an ultraviolet radiation emitting target screen in combination with means for scanning said electron beam across the target screen; and wherein said output means for modulating said optical beam comprises means for modulating said electron beam thereby to generate on said target screen of the cathode ray tube an ultraviolet image characteristic of the television image to be displated; and means for projecting said ultraviolet image upon the display screen so that the strips of different color producing elements will render visible the television image with proper registration of the colors.

4. For a beam-index line-screen multi-color projection television display apparatus, a display screen mountable against a wall for scanning by an optical beam of energy comprising: a plurality of optically sensitive strip-like regions of different color producing elements; and beam-index means comprising a plurality of optically sensitive spaced apart striplike regions, in register with the color producing elements, which produce optical index signals in response to excitation by the optical scanning beam, light pipe means for transmitting these optical index signals transversely of the display screen to the periphery thereof, and means for combining the thustransmitted signals.

5. The display screen of claim 4 wherein said spaced apart strip-like regions comprise strips of scintillator material with light pipe properties responsive to excitation by the optical scanning beam, thereby to provide said optical index signals and to transmit them transversely of the display screen to the periphery thereof.

6. The display screen of claim 4 wherein the combining means comprises scintillator means, responsive to said optical index signals, positioned to receive and be excited by said optical index signals thereby to generate a set of second optical index signals.

7. The display screen of claim 6 wherein said scintillator means comprises an elongated light pipe-scintillator disposed along the periphery of the display screen to receive and be excited along its length by said optical index signals.

8. The article of claim 4 wherein the display screen has a substrate on which the color producing elements are mounted; wherein said substrate comprises a light pipe-scintillator responsive to the scanning optical beam; and wherein said spaced apart strip-like regions comprise relatively narrow openings in said color producing elements which enable the scanning beam to excite the light pipe-scintillator in order to generate the optical index signals.

9. The article of claim 8 wherein the combining means comprises an elongated light pipe-scintillator disposed along the periphery of the substrate to receive and be excited along its length by the optical index signals, thereby to generate a set of second optical index signals.

10. The display screen of claim 4 wherein the combining means comprises at least one photo-detector which provides as an output an electrical index signal.

11. In a beam-index line-screen color cathode ray tube having an envelope with an electron gun section for providing a scannable electron beam and faceplate section with a target screen having a repeating array of different color producing strips for generating a viewable image, said target screen also having index-signal generating means which provide optical index signals indicative of the position of impact of the electron beam on the target screen; the improvement wherein said optical index signals are transmitted transversely of the target screen by a plurality of spaced apart optical light pipes disposed inside said envelope, adjacent said target screen, in register with said color producing strips.

12. The cathode ray tube of claim 11 wherein the envelope of the tube includes an intermediate section which is frustoconical in shape and joins the electron gun section to the faceplate section; wherein said optical light pipes are mounted on the interior surface of said faceplate section; and wherein said light pipes have exit terminals which are brought together inside the envelope of the tube thereby to provide a combined optical index signal.

13. A cathode ray tube in accordance with claim 11 including an electron permeable electrically conductive layer deposited upon both the color producing strips and the spaced apart optical light pipes in register therewith.

14. A cathode ray tube in accordance with claim 11 wherein said optical light pipes are made of electron-sensitive material which generate said optical index signals in response to impact by the scannable electron beam.

15. A cathode ray tube in accordance with claim 14 wherein the optical index signals generated by said electron-sensitive material are in the ultraviolet region of the spectrum.

16. A cathode ray tube in accordance with claim 11 wherein said optical light pipes are coated with electron-sensitive material which generate said optical index signals in response to impact by the scannable electron beam.

17. A cathode ray tube in accordance with claim 11 wherein said optical light pipes have exit terminals which are brought together thereby to provide a combined optical index signal.

18. A cathode ray tube in accordance with claim 11 wherein a set of red, green, and blue color producing strips are disposed between successive optical light pipes.

19. A cathode ray tube in accordance with claim 11 wherein first selected optical light pipes have exit terminals which are brought together to furnish a first combined optical index signal, and second selected optical light pipes have exit terminals which are brought together to furnish a second combined optical index signal.

20. A cathode ray tube in accordance with claim 19 wherein a first set of different color producing strips are disposed between successive light pipes of said first selected optical light pipes and a second set of different color producing strips are disposed between successive light pipes of said second selected optical light pipes.

21. The cathode ray tube of claim 11 including means for combining the optical index signals comprising an elongated light pipe-scintillator disposed to receive and be excited along its length by the optical index signals transmitted transversely of the target screen, thereby to generate a set of second optical index signals.

22. The cathode ray tube of claim 21 wherein the faceplate section is joined to the envelope of the tube by a frit seal; and wherein the elongated light pipe-scintillator is disposed within the envelope but extends through the frit seal, thereby to transmit said second optical index signals to the exterior of the tube.

23. The cathode ray tube of claim 11 wherein the faceplate section is joined to the envelope of the tube by a frit seal, and wherein the plurality of optical light pipes extend through the frit seal to transmit the optical index signals to the exterior periphery of the tube; and means for combining the thus-transmitted optical index signals.

24. The combination of claim 23 wherein the means for combining the optical index signals comprises scintillator means, responsive to said optical index signals, positioned outside the tube to receive and be excited by said optical index signals thereby to generate a set of second optical index signals.

25. The combination of claim 24 wherein said scintillator disposed along the periphery of the faceplate to receive and be excited along its length by the optical index signals transmitted through the frit seal.

26. A line-screen beam-index multi-color cathode ray tube comprising an electron beam source and a transparent faceplate with strip-like regions of different color producing elements on the inside surface thereof, and in register therewith spaced apart other strip-like regions for producing electron beam locating optical index signals for transmission along and within the faceplate by light pipe action to the periphery thereof; in combination with an elongated light pipe-scintillator disposed adjacent said periphery to receive and be excited along its length by said optical index signals, thereby to provide a set of second optical index signals.

27. The combination of claim 26 including an electrically conductive electron permeable layer situated on top of the color producing elements and said other strip-like regions.

28. The combination of claim 27 wherein the transparent faceplate is made of a material which scintillates in response to electron beam impingement, and wherein spaced apart openings between the color producing elements provide said other strip-like regions for producing the electron beam locating optical index signals.

29. A beam-index line-screen color cathode ray tube having an envelope with an electron gun section for providing a scannable electron beam; a frusto-conical intermediate section; and a faceplate section with a target screen having a repeating array of different color producing strips, for generating a viewable image, in register with a plurality of spaced apart strips of phosphor affixed to the interior side of said faceplate for generating optical index signals indicative of the position of impact of the electron beam on the target screen; in combination with a continuous layer of a transparent light pipe-scintillator, disposed on the exterior side of said faceplate, responsive to the optical index signals transmitted through said faceplate thereby to generate second optical index signals which are light piped to the periphery of said light pipe-scintillator; and means at said periphery for receiving and utilizing said second optical index signals.

30. The combination of claim 29 wherein said last mentioned means comprises a hollow thin-walled light pipe of frusto-conical shape, surrounding said intermediate section, for transmitting and concentrating said second optical index signals.

31. The combination of claim 29 wherein said last mentioned means comprises an elongated light pipe-scintillator disposed to receive and be excited by said second optical index signals, thereby to generate a set of third optical index signals.

32. The combination of claim 29 wherein said spaced apart strips of phosphor and said faceplate are made of the same material, and wherein said array of different color producing strips have narrow strip-like openings which coincide with said spaced apart strips.

33. A beam-index line-screen color cathode ray tube having an envelope with an electron gun section for providing a scannable electron beam, a frusto-conical intermediate section, and a faceplate on which is mounted a target screen having a repeating array of different color producing strips for generating a viewable image; said target screen also having index-signal generating means which provide optical index signals indicative of the position of impact of the electron beam on the target screen; in combination with means for collecting, transmitting, and concentrating said optical index signals comprising a thin-walled frusto-conical light pipe; and means for receiving and utilizing the optical index signals at the narrow end of said light pipe.

34. The combination of claim 33 wherein said array of different color producing strips have narrow spaced apart strip-like openings; wherein said faceplate contains scintillator material which coincides with the spaced apart openings, thereby to generate the optical index signals within the faceplate in response to electron beam excitation; and wherein the faceplate is sealed to said intermediate section which then serves as said thin-walled frusto-conical light pipe.

* * * * *